United States Patent
Yamada et al.

(10) Patent No.: US 11,211,603 B2
(45) Date of Patent: *Dec. 28, 2021

(54) SILICON NANOPARTICLE-CONTAINING HYDROGEN POLYSILSESQUIOXANE CALCINED PRODUCT-METAL OXIDE COMPLEX AND PRODUCTION METHOD THEREOF, NEGATIVE ELECTRODE ACTIVE MATERIAL FOR LITHIUM ION BATTERY, NEGATIVE ELECTRODE FOR THE LITHIUM ION BATTERY AND LITHIUM ION BATTERY

(71) Applicants: JNC CORPORATION, Tokyo (JP); JNC PETROCHEMICAL CORPORATION, Tokyo (JP)

(72) Inventors: Hirotsuna Yamada, Chiba (JP); Yoshihito Takano, Chiba (JP); Tetsuro Kizaki, Chiba (JP); Masakazu Kondo, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 192 days.

This patent is subject to a terminal disclaimer.

(21) Appl. No.: 16/477,200

(22) PCT Filed: Jan. 10, 2018

(86) PCT No.: PCT/JP2018/000346
§ 371 (c)(1),
(2) Date: Jul. 11, 2019

(87) PCT Pub. No.: WO2018/131606
PCT Pub. Date: Jul. 19, 2018

(65) Prior Publication Data
US 2019/0363353 A1 Nov. 28, 2019

(30) Foreign Application Priority Data

Jan. 11, 2017 (JP) .............................. JP2017-002953

(51) Int. Cl.
*H01M 4/00* (2006.01)
*H01M 4/36* (2006.01)
(Continued)

(52) U.S. Cl.
CPC ............ *H01M 4/366* (2013.01); *C01B 33/02* (2013.01); *C01B 33/113* (2013.01);
(Continued)

(58) Field of Classification Search
CPC ...... H01M 4/366; H01M 4/386; H01M 4/628; H01M 10/0525; H01M 2004/021;
(Continued)

(56) References Cited

U.S. PATENT DOCUMENTS 11,027,978 B2* 6/2021 Takano ................... H01M 4/38
11,031,591 B2* 6/2021 Takano ................... C01B 33/02
(Continued)

FOREIGN PATENT DOCUMENTS

JP S6290863 4/1987
JP 2008171813 7/2008
(Continued)

OTHER PUBLICATIONS

Somodi et al., "Vesicular hydrogen silsesquioxane-mediated synthesis of nanocrystalline silicon dispersed in a mesoporous silica/suboxide matrix, with potential for electrochemical applications", New J. Chem., 2015, 39, pp. 621-630. (Year: 2014).*
(Continued)

*Primary Examiner* — Nicholas P D'Aniello
(74) *Attorney, Agent, or Firm* — JCIPRNET

(57) ABSTRACT

A silicon nanoparticle-containing hydrogen polysilsesquioxane sintered product-metal oxide complex comprising a
(Continued)

silicon nanoparticle-containing hydrogen polysilsesquioxane sintered product and a metal oxide, wherein the silicon nanoparticle-containing hydrogen polysilsesquioxane sintered product contains 5 wt % to 95 wt % of silicon nanoparticles having a volume-based mean particle size of more than 10 nm but less than 500 nm, and a hydrogen polysilsesquioxane-derived silicon oxide structure that coats the silicon nanoparticles and is chemically bonded to the surfaces of the silicon nanoparticles. The silicon nanoparticle-containing hydrogen polysilsesquioxane sintered product is represented by the general formula $SiO_xH_y$ ($0.01<x<1.35$, $0<y<0.35$) and has Si—H bonds. The metal oxide consists of one or more metals selected from titanium, zinc, zirconium, aluminum, and iron.

11 Claims, 2 Drawing Sheets

(51) Int. Cl.
| | |
|---|---|
| *C01B 33/02* | (2006.01) |
| *C01B 33/113* | (2006.01) |
| *C01G 23/00* | (2006.01) |
| *H01M 4/38* | (2006.01) |
| *H01M 4/62* | (2006.01) |
| *H01M 10/0525* | (2010.01) |
| *H01M 4/02* | (2006.01) |

(52) U.S. Cl.
CPC .......... *C01G 23/003* (2013.01); *H01M 4/386* (2013.01); *H01M 4/628* (2013.01); *H01M 10/0525* (2013.01); *C01P 2002/74* (2013.01); *C01P 2002/82* (2013.01); *C01P 2004/62* (2013.01); *C01P 2004/64* (2013.01); *C01P 2006/40* (2013.01); *H01M 2004/021* (2013.01); *H01M 2004/027* (2013.01)

(58) Field of Classification Search
CPC ........... H01M 2004/027; H01M 4/134; H01M 4/483; H01M 10/052; C01B 33/02; C01B 33/113; C01G 23/003; C01G 23/053; C01P 2002/74; C01P 2002/82; C01P 2004/62; C01P 2004/64; C01P 2006/40; C01P 2004/61; C01P 2004/80; C01P 2004/03; Y02E 60/10
See application file for complete search history.

(56) References Cited

U.S. PATENT DOCUMENTS

| | | | |
|---|---|---|---|
| 11,127,947 B2 * | 9/2021 | Takano | H01M 4/386 |
| 2008/0166634 A1 * | 7/2008 | Kim | H01M 4/131 |
| | | | 429/218.1 |
| 2014/0057176 A1 | 2/2014 | Park et al. | |

FOREIGN PATENT DOCUMENTS

| | | |
|---|---|---|
| JP | 2011096455 | 5/2011 |
| JP | 2016514898 | 5/2016 |
| KR | 20080064778 | 7/2008 |
| WO | 2016208314 | 12/2016 |

OTHER PUBLICATIONS

Goojin Jeong et al., "Multifunctional TiO2 coating for SiO anode in Li-ion batteries", Journal of Materials Chemistry, vol. 22, Feb. 2012, pp. 7999-8004.

International Search Report (Form PCT/ISA/210) of PCT/JP2018/000346, dated Jun. 5, 2018, with English translation thereof, pp. 1-3.

* cited by examiner

SILICON NANOPARTICLE-CONTAINING HYDROGEN POLYSILSESQUIOXANE CALCINED PRODUCT-METAL OXIDE COMPLEX AND PRODUCTION METHOD THEREOF, NEGATIVE ELECTRODE ACTIVE MATERIAL FOR LITHIUM ION BATTERY, NEGATIVE ELECTRODE FOR THE LITHIUM ION BATTERY AND LITHIUM ION BATTERY

CROSS-REFERENCE TO RELATED APPLICATION

This application is a 371 application of an international PCT application serial no. PCT/JP2018/000346, filed on Jan. 10, 2018, which claims the priority benefit of Japan application no. JP2017-002953, filed on Jan. 11, 2017. The entirety of each of the abovementioned patent application is hereby incorporated by reference herein and made a part of this specification.

TECHNICAL FIELD

This invention relates to a silicon nanoparticle-containing hydrogen polysilsesquioxane calcined product-metal oxide complex and a production method thereof. Furthermore, the present invention relates to a negative electrode active material for a lithium ion battery, containing the silicon nanoparticle-containing hydrogen polysilsesquioxane calcined product-metal oxide complex, a negative electrode for a lithium ion battery containing the negative electrode active material, and a lithium ion battery comprising the negative electrode for the lithium ion battery.

BACKGROUND ART

Various portable devices have been recently widely used in association with rapid evolution of electronic devices and communication devices, etc., and development of the size reduction technology. Then, as a power supply of the above portable devices, from the viewpoints of economic efficiency, size reduction and weight reduction of the device, development of the secondary battery having high capacity and excellent service-life properties are strongly desired.

As a small-seized secondary battery having lightweight and high capacity described above, development currently progresses on a rocking chair type lithium ion battery in which a lithium intercalation compound that releases a lithium ion from an interlayer is used as a positive electrode material, and a carbon material represented by graphite and the like that can intercalate or deintercalate the lithium ion into or from the interlayer between crystal planes during the charge-discharge is used as a negative electrode material. Such lithium ion battery has been brought into practical use and generally used.

A nonaqueous electrolyte secondary battery in which a lithium compound is used as a negative electrode has high voltage and high energy density, and among them, a lithium metal has been targeted by many researches as a negative electrode active material in an early stage because of high battery capacity. However, when the lithium metal is used as a negative electrode, a large amount of dendritic lithium precipitates on a surface of negative electrode lithium during charge, and therefore the charge-discharge efficiency is reduced, or the dendritic lithium grows to cause short circuiting with a positive electrode in several cases. In addition, the lithium metal itself is unstable, and has high reactivity, and is sensitive to heat and shock, and therefore problems have remained in commercialization of the negative electrode using the lithium metal.

Then, as a negative electrode active material in place of the lithium metal, a carbon-based negative electrode that intercalates or deintercalates lithium has come to be used (Patent Literature 1).

The carbon-based negative electrode had solved the various problems of the lithium metal, and greatly contributed to spreading of lithium ion battery. However, as mobile apparatus was gradually downsized, lightweighted, and highly advanced, the important problems regarding increasing the capacity of the lithium ion battery was recognized accordingly.

The lithium ion battery using the carbon-based negative electrode essentially has low battery capacity due to the porous structure of carbon. For example, even in the case of using the graphite having the highest crystallinity as a carbon, the theory capacity is 372 mAh/g in the composition of $LiC_6$. In comparison, this value is only approximately 10% of the theory capacity of the lithium metal of 3860 mAh/g. From the situations, regardless of the above problems, the studies for increasing the capacity of the battery by introducing metals such as lithium into a negative electrode is actively attempted again.

As a representative, using a material containing a metal that can be alloyed with the lithium (Si, Sn and Al) as a negative electrode active material is studied. However, the material that can be alloyed with the lithium, such as Si and Sn, may expand the volume during the alloying reaction with the lithium to produce the fine powder of the metal material particles so as to reduce the contact between the metal material particles. Thereby, an active material is produced which is electrically isolated therefrom within the electrode in some cases. Further, the material has the problems of causing elimination of the metal material particles from the electrode to increase internal resistance and reduce the capacity, resulting in reducing cycle performance, or increasing severity of electrolyte decomposition reaction by increasing the specific surface area, or the like.

In order to solve the problems of such metal material, the studies on using a metal oxide having a relatively lower coefficient of volume expansion than the metal as a raw material of the negative electrode active material was conducted.

For example, Patent Literature 2 discloses that the battery having high capacity and improved cycle properties are obtained when the materials where a silicon oxide having silicon concentration gradient which is covered with a titanium oxide is used as a negative electrode active material of a lithium ion secondary battery.

Patent Literature 3 proposes using a material where the surface of silicon nanoparticle dispersed is covered with the titanium oxide as a negative electrode active material of a lithium ion secondary battery.

Non-patent Literature 1 discloses that a material where the silicon oxide is covered with the anatase-type titanium oxide is used as a negative electrode of a lithium ion battery.

Any conventional methods described above which use the material containing a silicon oxide-based compound covered with titanium oxide can be confirmed to improve initial capacity and cycle properties to a certain level, but cannot provide practical cycle properties because the capacity which is reversibly available is gradually decreased by performing the charge-discharge repeatedly.

Furthermore, such methods were inferior in terms of the productivity as a production method of negative electrode materials resulting in high cost.

CITATION LIST

Patent Literature

Patent Literature 1: JP S62-090863 A
Patent Literature 2: U.S. Patent Publication No. 2014/0057176A1
Patent Literature 3: JP 2011-96455 A Non-Patent Literature Non-Patent literature 1: J. Mater. Chem., 2012, 22, 7999-8004

SUMMARY OF INVENTION

Technical Problem

For the negative electrode active material for a lithium ion secondary battery, such problems of a conventional negative electrode material are still required to be solved by extremely suppressing the deterioration in the charge-discharge cycle, having high capacity and providing excellent charge-discharge properties. For the production method, high productivity is required.

The objects of the present invention are to provide a negative electrode active material for a secondary battery which can respond to these demands, and also provide the production method of the negative electrode active material for the secondary battery capable of production in high productivity.

Solution to Problem

The present inventors have diligently continued to conduct the study toward solving the problems, and as a result, the present inventors have found that the lithium ion battery having excellent charge-discharge cycle properties, high capacity, excellent initial charge-discharge efficiency and capacity maintenance rate can be provided by using a specific silicon nanoparticle-containing hydrogen polysilsesquioxane calcined product-metal oxide complex. As a result, the present invention has been achieved.

More specifically, the present invention includes the aspects described below.

[1] A silicon nanoparticle-containing hydrogen polysilsesquioxane calcined product-metal oxide complex comprising a silicon nanoparticle containing hydrogen polysilsesquioxane calcined product and a metal oxide, wherein the silicon nanoparticle-containing hydrogen polysilsesquioxane calcined product comprises 5 to 95% by weight of a silicon nanoparticle having a volume-basis mean particle size of more than 10 nm and less than 500 nm and a silicon oxide structure derived from a hydrogen polysilsesquioxane being chemically bonded to a surface of the silicone nanoparticle and covering the silicon nanoparticle, wherein the silicon nanoparticle-containing hydrogen polysilsesquioxane calcined product is represented by a general formula $SiO_xH_y$ ($0.01 < x < 1.35$, $0 < y < 0.35$), wherein the silicon nanoparticle-containing hydrogen polysilsesquioxane calcined product has a Si—H bond, and wherein the metal oxide comprises at least one of metals selected from the group consisting of titanium, zinc, zirconium, aluminum and iron.

[2] The silicon nanoparticle-containing hydrogen polysilsesquioxane calcined product-metal oxide complex according to [1], wherein when an intensity of a maximum absorption peak within an absorption band of 820 to 920 $cm^{-1}$ derived from a Si—H bond is $I_1$ and an intensity of a maximum absorption peak within an absorption band in 1000 to 1250 $cm^{-1}$ derived from a Si—O—Si bond is $I_2$ in an spectrum obtained by measuring the silicon nanoparticle-containing hydrogen polysilsesquioxane calcined product by the infrared spectroscopy, an intensity ratio ($I_1/I_2$) is in a range of from 0.01 to 0.35.

[3] The silicon nanoparticle-containing hydrogen polysilsesquioxane calcined product-metal oxide complex according to [1] or [2], wherein within an absorption band in 1000 to 1250 $cm^{-1}$ derived from the Si—O—Si bond, when an intensity of a maximum absorption peak in a wavelength of 1100 $cm^{-1}$ or higher is $I_{2-1}$ and an intensity of a maximum absorption peak in a wavelength of 1100 $cm^{-1}$ or lower is $I_{2-2}$ in the spectrum obtained by measuring the silicon nanoparticle-containing hydrogen polysilsesquioxane calcined product by the infrared spectroscopy, an intensity ratio ($I_{2-1}/I_{2-2}$) is greater than 1.

[4] The silicon nanoparticle-containing hydrogen polysilsesquioxane calcined product-metal oxide complex according to any one of [1] to [3], wherein at least one part of the surface of the silicon nanoparticle-containing hydrogen polysilsesquioxane calcined product is covered with the metal oxide.

[5] The silicon nanoparticle-containing hydrogen polysilsesquioxane calcined product-metal oxide complex according to any one of [1] to [4], comprising more than 0% by weight and 10% by weight or less of the metal oxide.

[6] The silicon nanoparticle-containing hydrogen polysilsesquioxane calcined product-metal oxide complex according to any one of [1] to [5], wherein the metal oxide is titanium oxide.

[7] A negative electrode active material for a lithium ion battery comprising the silicon nanoparticle-containing hydrogen polysilsesquioxane calcined product-metal oxide complex according to any one of [1] to [6].

[8] A negative electrode for a lithium ion battery comprising the negative electrode active material for a lithium ion battery according to [7].

[9] A lithium ion battery comprising the negative electrode for a lithium ion battery according to [8].

[10] A method for producing a silicon nanoparticle-containing hydrogen polysilsesquioxane calcined product-metal oxide complex comprising a silicon nanoparticle-containing hydrogen polysilsesquioxane calcined product and a metal oxide, wherein the silicon nanoparticle-containing hydrogen polysilsesquioxane calcined product comprises 5 to 95% by weight of a silicon nanoparticle having a volume-basis mean particle size of more than 10 nm and less than 500 nm and a silicon oxide structure derived from a hydrogen polysilsesquioxane being chemically bonded to a surface of the silicon nanoparticle and covering the silicon nanoparticle, wherein the silicon nanoparticle-containing hydrogen polysilsesquioxane calcined product is represented by a general formula $SiO_xH_y$ ($0.01 < x < 1.35$, $0 < y < 0.35$), wherein the silicon nanoparticle-containing hydrogen polysilsesquioxane calcined product has a Si—H bond, and wherein the metal oxide comprises at least one of metals selected from the group consisting of titanium, zinc, zirconium, aluminum and iron;

wherein the method comprising:

covering at least one part of a surface of the silicon nanoparticle-containing hydrogen polysilsesquioxane calcined product with the metal oxide by hydrolyzing a metal alkoxide in the presence of the silicon nanoparticle-containing hydrogen polysilsesquioxane calcined product and, heating the silicon nanoparticle-containing hydrogen polysilsesquioxane calcined product covered with the metal oxide within a temperature range of 200 to 900° C. under the inert gas atmosphere.

[11] A method according to [10] wherein the metal alkoxide is a titanium tetra-alkoxide.

Advantageous Effects of Invention

A lithium ion battery using a silicon nanoparticle-containing hydrogen polysilsesquioxane calcined product-metal oxide complex of the present invention as a negative electrode active material not only has high speed charge-discharge properties by complexing with a metal oxide, but also has excellent charge-discharge cycle properties, high capacity, excellent initial charge-discharge efficiency and capacity maintenance rate because a specific silicon nanoparticle-containing hydrogen polysilsesquioxane calcined product is used.

DESCRIPTION OF EMBODIMENT

Figure 1:
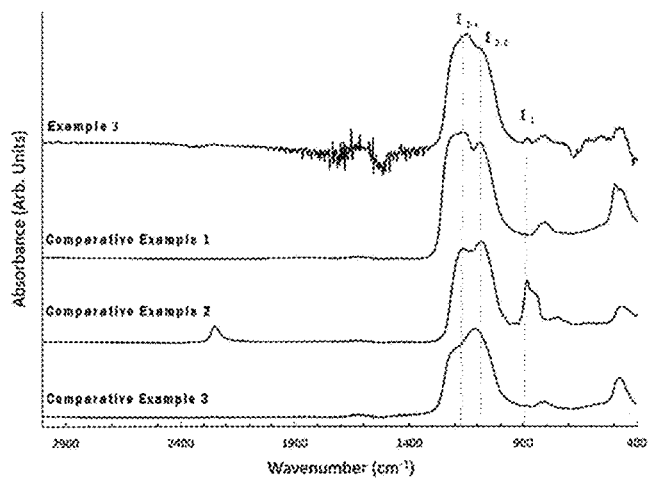
FIG. 1 is a chart of IR absorption spectra of the silicon nanoparticle-containing hydrogen polysilsesquioxane calcined product (3) obtained in Example 3, the silicon nanoparticle-containing hydrogen polysilsesquioxane calcined product (5) obtained in Comparative Example 1, the silicon nanoparticle-containing hydrogen polysilsesquioxane calcined product (6) obtained in Comparative Example 2, and the silicon monoxide powder obtained in Comparative Example 3, which were measured by the infrared spectroscopy (IR).

Hereinafter, the present invention will be described in more detail.

A silicon nanoparticle-containing hydrogen polysilsesquioxane calcined product-metal oxide complex can be obtained by complexing the silicon nanoparticle-containing hydrogen polysilsesquioxane calcined product with a metal oxide and conducting heat treatment. The silicon nanoparticle-containing hydrogen polysilsesquioxane calcined product can be obtained by calcining the silicon nanoparticle-containing hydrogen polysilsesquioxane which is a precursor of the silicon nanoparticle-containing hydrogen polysilsesquioxane calcined product. Therefore, the explanations are described in order from the silicon nanoparticle-containing hydrogen polysilsesquioxane, the silicon nanoparticle-containing hydrogen polysilsesquioxane calcined product to the silicon nanoparticle-containing hydrogen polysilsesquioxane calcined product-metal oxide complex.

<Production of Silicon Nanoparticle-Containing Hydrogen Polysilsesquioxane>

The silicon nanoparticle-containing hydrogen polysilsesquioxane can be obtained by adding silicon nanoparticles during synthesis of a hydrogen silsesquioxane polymer (HPSQ) by the hydrolysis reaction and a condensation reaction (also called polycondensed reaction) of a silicon compound represented by formula (1), but the production method is not particularly limited thereto. Specific examples include a method of conducting the hydrolysis reaction and the condensation reaction of a mixture obtained by adding silicon nanopowders to the silicon compound represented by formula (1), and a method of dripping a silicon compound represented by formula (1) into a solvent in which the silicon nanopowders are dispersed and conducting the hydrolysis reaction and the condensation reaction.

$$HSi(R)_3 \qquad (1)$$

In formula (1), R is a halogen atom, a hydrogen atom or a group selected from substituted or unsubstituted alkoxy group having 1 to 10 carbons, and substituted or unsubstituted aryloxy group having 6 to 20 carbons, which are identical with or different from each other, provided that in substituted or unsubstituted alkoxy group having 1 to 10 carbons, and substituted or unsubstituted aryloxy group having 6 to 20 carbons, an arbitrary hydrogen atom may be replaced with a halogen atom.

The silicon compound represented by a formula (1) includes the following compounds.

Examples include trihalogenated silane or dihalogenated silane such as trichlorosilane, trifluorosilane, tribromosilane and dichlorosilane; trialkoxysilane or dialkoxysilane such as tri-n-butoxysilane, tri-t-butoxysilane, tri-n-propoxysilane, tri-i-propoxysilane, di-n-butoxyethoxysilane, triethoxysilane, trimethoxysilane and diethoxysilane; and aryloxysilane or aryloxyalkoxysilane such as triaryloxysilane, diaryloxysilane and diaryloxyethoxysilane.

Among the above compounds, from the viewpoints of reactivity, ease of availability and production cost, trihalogenated silane or trialkoxysilane are preferred, and trihalogenated silane is particularly preferred.

The silicon compounds represented by formula (1) may be used alone, or two or more kinds of the silicon compounds may be mixed and used.

The silicon compound represented by formula (1) has high hydrolyzability and condensation reactivity, and therefore, by using the silicon compound, the silicon nanoparticle-containing hydrogen polysilsesquioxane can be easily obtained. In addition, by using of the silicon compound represented by formula (1), an advantage that an amount of the Si—H bond in the silicon nanoparticle-containing hydrogen polysilsesquioxane calcined product can be easily controlled in heat treatment to the silicon nanoparticle-containing hydrogen polysilsesquioxane under the non-oxidizing atmosphere is obtained.

Next, the hydrolysis reaction and the polycondensation reaction of the mixture obtained by adding the silicon nanoparticles to the silicon compound represented by formula (1) will be described.

The hydrolysis reaction can be performed by a conventional method, for example, the hydrolysis reaction can be performed in a solvent such as an alcohol or DMF in the presence of an inorganic acid such as hydrochloric acid or an organic acid such as acetic acid and water at the ordinary temperature or under heating. Accordingly, the reaction mixture after the hydrolysis reaction may contain a solvent, an acid and water, and a material derived therefrom, in addition to the hydrolysate of the silicon compound represented by formula (1).

In the reaction mixture after the hydrolysis reaction, the silicon compound represented by formula (1) is not necessary to be completely hydrolyzed, and a part of the silicon compound may remain.

In addition, the polycondensation reaction of the hydrolysate also partially progresses in addition to the hydrolysis reaction.

A progress degree of the polycondensation reaction can be controlled by hydrolysis temperature, hydrolysis time, acidity and/or solvent or the like.

For example, a progress degree can be appropriately set according to the silicon nanoparticle-containing hydrogen polysilsesquioxane as described later.

In consideration of the productivity and the production cost thereof, a method in which the hydrolysis reaction and the condensation reaction are concurrently carried out under identical conditions in one reactor is preferred.

As reaction conditions, the silicon compound represented by formula (1) is added to an acidic aqueous solution under stirring, and is allowed to react at a temperature of −20 to 50° C., preferably 0 to 40° C., and particularly preferably 10 to 30° C., for 0.5 to 20 hours, preferably for 1 to 10 hours, and particularly preferably for 1 to 5 hours.

The acidity of the hydrolyzed solution is preferably adjusted ordinarily to pH 7 or less, and more preferably to pH 6 or less, and further preferably pH 3 or less. As an acid used for pH adjustment, any of the organic acid and the inorganic acid can be used.

Specific examples of the organic acid include formic acid, acetic acid, propionic acid, oxalic acid and citric acid. Specific examples of the inorganic acid include hydrochloric acid, sulfuric acid, nitric acid and phosphoric acid. Among the above acids, hydrochloric acid and acetic acid are preferred in view of easily controlling the hydrolysis reaction and the subsequent polycondensation reaction, and the ease of the availability, the pH adjustment and the treatment after the reaction.

When a halogenated silane such as trichlorosilane is used as a silicon compound represented by formula (1), the acidic aqueous solution is formed in the presence of water, and therefore an acid is not necessary to be added separately, which is one of preferred aspects of the present invention.

The silicon nanoparticle-containing hydrogen polysilsesquioxane which is a precursor of the silicon nanoparticle-containing hydrogen polysilsesquioxane calcined product can be obtained by conducting the hydrolysis reaction and the polycondensation reaction of the compound represented by formula (1) in the coexistence of the silicon nanoparticles. The silicon nanoparticles to be used are not particularly limited as long as a volume-basis mean particle size thereof is more than 10 nm and less than 500 nm. As for the lower limit of volume-basis mean particle size, more than 20 nm is preferable, and more than 30 nm is further preferable. As for the upper limit of volume-basis mean particle size, less than 400 nm is preferable, and less than 300 nm is further preferable. The silicon nanopowder or the like is preferably used as silicon nanoparticles. The durability of the resultant negative electrode tends to easily deteriorate while the initial electric discharge efficiency becomes higher, when a large quantity of silicon nanoparticles is used. However, the use of the microparticulated silicon nanoparticles can suppress the deterioration in durability. Therefore, the silicon nanoparticles which do not include any particle having a particle size of 1000 nm or more is preferable to use.

The silicon nanoparticles may contain components other than silicon for example carbons and metals, etc., within the range that the advantageous effects of the present invention are not adversely affected. The content thereof is ordinarily less than 5% by weight to the silicon nanoparticles. The silicon nanoparticles which essentially do not include any carbons or any metals can be also used.

The volume-basis mean particle size herein means a particle size calculated by the volume-basis, and may be occasionally referred to simply as a mean particle size.

The silicon nanoparticles are usually added so that the content can be 5 to 95% by weight based on the silicon nanoparticle-containing hydrogen polysilsesquioxane calcined product to be obtained. If the content is 5% by weight or more, when the calcined product thereof is used as a negative electrode active material for a lithium ion battery, initial charge-discharge efficiency is high and the effect of complexation with the silicon nanoparticles can be sufficiently obtained. If the content is 95% or less, when the calcined product is used as a negative electrode active material for the lithium ion battery, the expansion and contraction rate of the negative electrode active material is not increased by stress relaxation of the complexed hydrogen silsesquioxane and capacity maintenance rate is sufficiently held, even when the charge-discharge are performed. As for the lower limit of the formulation amount of silicon nanoparticles, 10% by weight or more are preferable, and 20% by weight or more are further preferable. As for the upper limit of the blending amount of silicon nanoparticles, 90% by weight or less are preferable, and 80% by weight or less are more preferable.

After the completion of the hydrolysis reaction and the polycondensation reaction, a liquid portion is separated and removed by a conventional method such as filtration separation, centrifugal separation or decantation. In some cases, the resulting material is further washed with water or an organic solvent, and then dried, and thus silicon nanoparticle-containing hydrogen polysilsesquioxane of the present invention can be obtained.

<Structure of Silicon Nanoparticle-Containing Hydrogen Polysilsesquioxane>

The silicon nanoparticle-containing hydrogen polysilsesquioxane has features that an intensity ratio ($I_{2-1}/I_{2-2}$) is greater than 1, when an intensity of a maximum absorption peak (peak 2-1) in a wavelength of 1100 $cm^{-1}$ or higher is $I_{2-1}$ and an intensity of a maximum absorption peak (peak 2-2) in a wavelength of 1100 $cm^{-1}$ or lower is $I_{2-2}$ within an absorption bands in 1000 to 1250 $cm^{-1}$ derived from the Si—O—Si bond in the spectrum obtained by measurement with the infrared spectroscopy. The intensity ratio of greater than 1 indicates that the silicon nanoparticle-containing hydrogen polysilsesquioxane has a chemical bond between the silicon nanoparticles existing therein and the hydrogen polysilsesquioxane, and the particle disintegration caused by the expansion and contraction of the silicon nanoparticles during the charge-discharge cycle is expected to be suppressed by the presence of the chemical bond.

An absorption band in 1000 to 1250 $cm^{-1}$ in an IR spectrum of the hydrogen polysilsesquioxane is derived from the asymmetric stretching vibration of the Si—O—Si bond. In the case of a straight-chain bond, multiple peaks of absorption are generally observed in 1000 to 1250 $cm^{-1}$, and in the case of a cyclization bond, one peak of absorption is generally observed in 1000 to 1100 cm$^{-1}$. In the IR spectrum of the silicon nanoparticle-containing hydrogen polysilsesquioxane, the absorption peak in higher than 1100 cm$^{-1}$ is attributed to be derived from the straight-chain bond of siloxane, and the absorption peak in lower than 1100 cm$^{-1}$ is attributed to be derived from both the straight-chain bond and the cyclization bond of siloxane.

When the silicon compound represented by formula (1) is subjected to the hydrolysis reaction and the condensation reaction alone without the coexistence of the silicon nanoparticles, the energy of a system is expected to be further reduced by the reaction of the polymer terminals with each other to form a cyclic siloxane rather than the reaction of the polymer terminal with a monomer to form a straight-chain siloxane. Accordingly, the results that peak 2-2 is larger than peak 2-1 can be easily predicted.

Meanwhile, the hydrolysis-polymerization of the silicon compound represented by formula (1) progresses in the coexistence of the silicon nanoparticles, and therefore if a terminal portion of a chain Si—O—Si structure included in the HPSQ polymer to be formed reacts with the silanol structure on a surface of the silicon nanoparticles, the polymerization is terminated at the terminal portion, and the chain Si—O—Si structure is kept. As a result, the formation of the cyclic Si—O—Si structure is conceivably suppressed in comparison with the case of the reaction of the silicon compound represented by formula (1) alone. Further, with regard to the above ratio, the ratio of the cyclization bond is almost maintained even after heat treatment. Therefore, the state of $I_{2-1}/I_{2-2}>1$ is also maintained even after the calcination.

Thus, in the silicon nanoparticle-containing hydrogen polysilsesquioxane, the silicon nanoparticles and the hydrogen polysilsesquioxane form a network through the strong chemical bond (Si—O—Si bond). The network is maintained even after the calcination, and the hydrogen polysilsesquioxane structure may play a role of a buffer layer against the expansion and contraction of the silicon nanoparticles, and as a result, the pulverization of the silicon nanoparticles caused during repetition of the charge-discharge is expected to be suppressed.

The silicon nanoparticle-containing hydrogen polysilsesquioxane thus obtained forms a secondary aggregate having a particle size of several microns which can be produced by further aggregating the primary particles being spherical particles having a particle size of a submicron meter.

Because the primary particles are small, when the calcined product of the silicon nanoparticle-containing hydrogen polysilsesquioxane is used as a negative electrode material for a lithium ion battery, the stress during the expansion and contraction caused during repetition of the charge-discharge is relaxed. Accordingly, the cycle deterioration is suppressed to be effective in improving cycle performance. Moreover, the silicon nanoparticle-containing hydrogen polysilsesquioxane has a complicated secondary aggregation structure, resulting in favorable binding properties with the binder to develop further excellent cycle performance.

Next, the silicon nanoparticle-containing hydrogen polysilsesquioxane calcined product obtained by calcining the silicon nanoparticle-containing hydrogen polysilsesquioxane will be described.

<Production of Silicon Nanoparticle-Containing Hydrogen Polysilsesquioxane Calcined Product>

The silicon nanoparticle-containing hydrogen polysilsesquioxane calcined product is obtained by heat treatment of the silicon nanoparticle-containing hydrogen polysilsesquioxane obtained under the non-oxidizing atmosphere by the method described above. The term "non-oxidizing" herein literally means that the silicon nanoparticle-containing hydrogen polysilsesquioxane is not oxidized, but substantially "non-oxidizing" involves the state that the formation of silicon dioxide is suppressed to a degree at which the advantageous effects of the present invention are not adversely affected upon heat treatment (More specifically, a value of $I_1/I_2$ may be adjusted to fall within a numerical range specified in the present invention). Accordingly, the state of "non-oxidizing" is meant to be that oxygen is removed so that the object can be achieved. In the specification, $I_1$ means an intensity of a maximum absorption peak (peak 1) in an absorption band of 820 to 920 cm$^{-1}$ derived from the Si—H bond. When the composition of the silicon nanoparticle-containing hydrogen polysilsesquioxane calcined product thus obtained is measured by elemental analysis, the silicon nanoparticle-containing hydrogen polysilsesquioxane calcined product constituting the silicon nanoparticle-containing hydrogen polysilsesquioxane calcined product-metal oxide complex contains a silicon atom (Si), an oxygen atom (O) and a hydrogen atom (H), and is represented by the general formula $SiO_xH_y$ ($0.01<x<1.35$, $0<y<0.35$).

If x is in the range of $0.01<x<1.35$, and preferably in the range of $0.1<x<1.0$ in the calcined product, the negative electrode active material having the sufficient battery capacity and excellent charge-discharge properties in which initial charge-discharge efficiency and cycle capacity maintenance rate are balanced can be obtained. If y is in the range of $0<y<0.35$, and preferably in the range of $0.01<y<0.2$ in the calcined product, the resulting secondary battery has good cycle performance with excellent charge-discharge capacity and improved capacity maintenance rate.

In addition, as for the silicon nanoparticle-containing hydrogen polysilsesquioxane calcined product, in the spectrum measured by the infrared spectroscopy, when the intensity of the maximum absorption peak (peak 1) within the absorption band in 820 to 920 cm$^{-1}$ derived from the Si—H bond is $I_1$, and the intensity of the maximum absorption peak (peak 2) within the absorption band in 1000 to 1250 cm$^{-1}$ derived from the Si—O—Si bond is $I_2$, the intensity ratio ($I_1/I_2$) is preferably in the range of 0.01 to 0.35.

When the ratio ($I_1/I_2$) of the intensity of peak 1 ($I_1$) and the intensity ($I_2$) of peak 2 is preferably in the range of 0.01 to 0.35, more preferably in the range of 0.01 to 0.30, and further preferably in the range of 0.03 to 0.20, the presence of a suitable amount of the Si—H bond can provide high discharge capacity, good initial charge-discharge efficiency and good cycle properties, when the calcined product is used as a negative electrode active material for the lithium ion battery.

As for the silicon nanoparticle-containing hydrogen polysilsesquioxane calcined product, in the spectrum measured by the infrared spectroscopy, in the absorption band in 1000 to 1250 cm$^{-1}$ derived from Si—O—Si bond, when an intensity of a maximum absorption peak (peak 2-1) in a wavelength of 1100 cm$^{-1}$ or higher is $I_{2-1}$ and an intensity of a maximum absorption peak (peak 2-2) in a wavelength of 1100 cm$^{-1}$ or lower is $I_{2-2}$, the intensity ratio ($I_{2-1}/I_{2-2}$) of the silicon nanoparticle-containing hydrogen polysilsesquioxane calcined product is preferably greater than 1. The intensity ratio of greater than 1 indicates that the silicon nanoparticle-containing hydrogen polysilsesquioxane calcined product has a chemical bond between the silicon nanoparticles existing therein and the silicon oxide structure derived from the hydrogen polysilsesquioxane, and a particle disintegration caused by the expansion and contraction of the silicon nanoparticles during the charge-discharge cycle is expected to be suppressed by the presence of the chemical bond.

As described above, heat treatment of the silicon nanoparticle-containing hydrogen polysilsesquioxane is preferably carried out under the non-oxidizing atmosphere. If heat treatment is carried out in the atmosphere including oxygen, a silicon dioxide is formed, thereby being unable to obtain a desired composition and a desired Si—H bonding amount.

The non-oxidizing atmosphere includes inert gas atmosphere, atmosphere in which oxygen is removed by high vacuum (The atmosphere is not limited to as long as oxygen is removed to a degree not suppressing the formation of the objective silicon nanoparticle-containing hydrogen polysilsesquioxane calcined product), the reduced atmosphere and the atmosphere combination of the above atmospheres. Specific examples of inert gas include nitrogen, argon and helium. The above inert gas can be used without any problems, if inert gas is in a high purity grade which is generally used. Moreover, the atmosphere in which oxygen is removed by high vacuum without using inert gas may be applied. The reduced atmosphere involves the atmosphere containing reduced gas such as hydrogen. Specific examples include a mixed gas atmosphere of 2% by volume or more of hydrogen gas and inert gas. In addition, as reduced gas, a hydrogen gas atmosphere can also be used.

The silicon nanoparticle-containing hydrogen polysilsesquioxane is heat-treated under the non-oxidizing atmosphere, thereby causing start of dehydrogenation of the Si—H bond from about 600° C. to form the Si—Si bond, and a characteristic silicon oxide structure derived from hydrogen polysilsesquioxane is formed. Even if the above heat treatment is carried out, the chemical bond between the silicon nanoparticles and hydrogen polysilsesquioxane is kept. The presence of the silicon oxide structure derived from the hydrogen polysilsesquioxane after heat treatment can be known by measurement by the infrared spectroscopy described later, or the like. If the Si—Si bond is moderately grown, the Si—Si bond is formed into excellent Li insertion site to serve as a source of a high charge capacity. Meanwhile, the Si—H bond interacts with a binder having a functional group such as a COO$^-$ group, being a conventional battery material component, to form a flexible and strong bond, and therefore when the battery is formed, the good cycle properties are developed.

Accordingly, a suitable amount of the Si—H bond is required to remain in order to develop both high capacity and good cycle performance. Heat treatment temperature satisfying such conditions is ordinarily 600 to 1000° C., and preferably 750 to 900° C. If the temperature is less than 600° C., the amount of Si—H bond is excessively large, and discharge capacity is not enough. If the temperature is more than 1000° C., the Si—H bonds disappear, and therefore good cycle performance are unable to be obtained. Furthermore, a strong SiO$_2$ layer is formed on the surface to suppress insertion and elimination of lithium, and therefore the capacity is hardly developed. Heat treatment time is not particularly limited, but is usually 15 minutes to 10 hours, and preferably 30 minutes to 5 hours.

The silicon nanoparticle-containing hydrogen polysilsesquioxane calcined product is obtained by heat treatment described above, in which heat treatment conditions may be appropriately selected, so that the results of the elemental analysis described the above can fall within the range of $SiO_xH_y$ (0.01<x<1.35, 0<y<0.35) in results of the elemental analysis described above, and also within the range of 0.01 to 0.35 in the ratio ($I_1/I_2$) of intensity ($I_1$) of peak 1 to intensity ($I_2$) of peak 2 by the infrared spectroscopy.

The thus obtained silicon nanoparticle-containing hydrogen polysilsesquioxane calcined product of the present invention is obtained by heat treatment to silicon nanoparticle-containing hydrogen polysilsesquioxane obtained by the synthetic method of the present invention. Thus, the shape thereof is formed of a secondary aggregate formed by further aggregating primary particles being spherical particles having a particle size of submicron order.

Because the primary particles are small, when the silicon nanoparticle-containing hydrogen polysilsesquioxane calcined product-metal oxide complex is used as a negative electrode material for a lithium ion battery, stress during the expansion and contraction caused during repetition of the charge-discharge is relaxed. Accordingly, the cycle deterioration is suppressed to be effective in improving cycle performance. Moreover, because of a complicated secondary aggregation structure, binding properties with the binder are improved to provide further excellent cycle performance.

<Production of Precursor of Silicon Nanoparticle-Containing Hydrogen Polysilsesquioxane Calcined Product-Metal Oxide Complex>

A silicon nanoparticle-containing hydrogen polysilsesquioxane calcined product-metal oxide complex can be obtained by complexing the silicon nanoparticle-containing hydrogen polysilsesquioxane calcined product with a metal oxide and conducting the heat treating. Therefore, a production method of a precursor of the silicon nanoparticle-containing hydrogen polysilsesquioxane calcined product-metal oxide complex (complexing the silicon nanoparticle-containing hydrogen polysilsesquioxane calcined product with a metal oxide) will be described.

The term complexing means that a metal oxide is fused and integrated with the silicon nanoparticle-containing hydrogen polysilsesquioxane calcined product, also includes an aspect in which the metal oxide is contained inside the silicon nanoparticle-containing hydrogen polysilsesquioxane calcined product and an aspect in which the metal oxide is bonded to the surface of the silicon nanoparticle-containing hydrogen polysilsesquioxane calcined product to cover the silicon nanoparticle-containing hydrogen polysilsesquioxane calcined product. In the present invention, the aspect in which the metal oxide covers the particles of the silicon nanoparticle-containing hydrogen polysilsesquioxane calcined product is preferable for the silicon nanoparticle-containing hydrogen polysilsesquioxane calcined product-metal oxide complex. The covering is not necessary to cover the entire particle, and a status that a part of the silicon nanoparticle-containing hydrogen polysilsesquioxane calcined product is covered is enough.

Various methods can be used as a method to cover the silicon nanoparticle-containing hydrogen polysilsesquioxane calcined product with a metal oxide. Examples include a method in which the silicon nanoparticle-containing hydrogen polysilsesquioxane calcined product is added to a suspension that metal oxide particles are suspended, and then filtering and drying thereof etc., are conducted. However, a method of suspending the silicon nanoparticle-containing hydrogen polysilsesquioxane calcined product in a liquid metal alkoxide, then performing the condensation reaction and covering the surface of the silicon nanoparticle-containing hydrogen polysilsesquioxane calcined product with a film of a metal oxide, and drying thereof, is more preferable.

For a metal oxide, the metal oxide including at least one selected from titanium, zinc, zirconium, aluminum and iron is preferable, and an oxide including titanium is further preferable. In an oxide including titanium, the metal oxide including 90% by weight or more of titanium to the total metal elements is more preferable, and metal oxide including 90% by weight or more of titanium to the total metal elements is preferable. For such a metal oxide, the examples include a metal oxide including only the titanium except for impurities as a metallic element (i.e., titanium oxide).

The above metal oxide may further include, as an constituent element, at least one of the group including hafnium, vanadium, niobium, tantalum, chrome, molybdenum, tungsten, manganese, ruthenium, cobalt, rhodium, iridium, nickel, palladium, cerium, indium, germanium, bismuth, antimony, cadmium copper and silver.

For raw materials used for the metal oxide for covering, examples include a metal alkoxide. In the case of applying titanium oxide as a covering material, the metal alkoxide is titanium alkoxide. Examples of the titanium alkoxide include titanium tetraalkoxide, titanium aryloxy trialkoxide, and titanium diaryl dialkoxide. The titanium tetraalkoxide is preferable, and specific examples of the titanium tetraalkoxide include a titanium tetraoctoxide, a titanium tetra-n-butoxide, a titanium tetra-i-propoxide, and a titanium tetrakis (2-ethylhexyloxide).

The condensation reaction of the silicon nanoparticle-containing hydrogen polysilsesquioxane calcined product with the metal alkoxide such as the titanium alkoxide can be performed by a conventional method, for example, performed in a solvent such as an alcohol or DMF, in the presence of an inorganic acid such as a hydrochloric acid, and/or an organic acid such as an acetic acid, and water, at the ordinary temperature or under heating as needed.

As reaction conditions, the reaction is performed under stirring at a temperature of −20 to 50° C., preferably 0 to 40° C., and particularly preferably 10 to 30° C., for 0.5 to 20 hours, preferably 1 to 10 hours, and particularly preferably 1 to 5 hours.

As for the ratio of the silicon nanoparticle-containing hydrogen polysilsesquioxane calcined product and the metal alkoxide, the metal oxide is used within a range of usually more than 0% by weight and 10% by weight or less, preferably 0.1% by weight or more and 10% by weight or less, more preferably 0.2% by weight or more and 8% by weight or less to the amount of the silicon nanoparticle-containing hydrogen polysilsesquioxane calcined product-metal oxide complex.

After the completion of the condensation reaction, a liquid proportion is separated and removed by vacuum drying or filtration separation or centrifuge separation etc. In some cases, the resulting material is further washed with a solvent, and then dried, and thus a precursor of the silicon nanoparticle-containing hydrogen polysilsesquioxane calcined product-metal oxide complex can be obtained.

<Production of Silicon Nanoparticle-Containing Hydrogen Polysilsesquioxane Calcined Product-Metal Oxide Complex>

The silicon nanoparticle-containing hydrogen polysilsesquioxane calcined product-metal oxide complex is obtained by conducting the heat treatment to the precursor of the silicon nanoparticle-containing hydrogen polysilsesquioxane calcined product-metal oxide complex under the inert gas atmosphere. Heat treatment temperature to provide the suppressed deterioration of charge-discharge cycles, the superior charge-discharge properties and the high capacity is 200 to 900° C., preferably 250 to 850° C., more preferably 250 to 800° C. Heat treatment time is not particularly limited, but is usually 30 minutes to 10 hours, and preferably 1 to 8 hours.

The silicon nanoparticle-containing hydrogen polysilsesquioxane calcined product-metal oxide complex obtained by the method described above is one where a metal oxide is complexed with or inside the silicon nanoparticle-containing hydrogen polysilsesquioxane calcined product. For example, a peak attributed to a titanium 2p electron of titanium oxide and a peak attributed to an oxygen 1s electron of titanium oxide were measured by an X-ray photoelectron spectroscopy (see FIG. 2($a$) and FIG. 2($b$)) in the silicon nanoparticle-containing hydrogen polysilsesquioxane calcined product-metal oxide complex obtained in the Examples. Therefore, in the silicon nanoparticle-containing hydrogen polysilsesquioxane calcined product-metal oxide complex obtained in the Examples, titanium oxide is expected to cover the particles of the silicon nanoparticle-containing hydrogen polysilsesquioxane calcined product.

The following three items are considered as an effect of the complexed metal oxide, particularly titanium oxide. The first is the impart of the conductivity to the active material. Titanium oxide itself is an insulator, but when an electron is injected to a conduction band by the lithium insertion, the electronic conductivity of the surface of the active material can be significantly improved at the charge. The second is the promotion of the delivery of the lithium at the interface of the active material and the electrolyte. The charge reaction of the silicon nanoparticle-containing hydrogen polysilsesquioxane calcined product requires a large amount of energy for reaction progress because of accompanying cleavage of silicon-oxygen bonds. However, activation barrier of the interface of the electrolyte and the active material is reduced by titanium oxide, and thus a smooth charge-discharge reaction can progress. The third is the shape stabilization. The titanium oxide can allow to take in and out the lithium without structural change. Therefore, when the titanium oxide is placed on the surface, the titanium oxide can stabilize the shape and suppress the fall of the active material and the suppression of the decomposition reaction of the electrolyte due to the appearance of the new surface.

The silicon oxide used in the present invention has the high charge-discharge cycle stability itself. By being covered with the titanium oxide, the above effects are additionally appeared to obtain higher charge-discharge cycle stability. The above effects can be seen not only in the case of titanium oxide but also in the case of a metal oxide containing zinc, zirconium, aluminum and iron.

<Negative Electrode Active Material Including Silicon Nanoparticle-Containing Hydrogen Polysilsesquioxane Calcined Product-Metal Oxide Complex>

Next, the negative electrode active material for lithium ion battery including the silicon nanoparticle-containing hydrogen polysilsesquioxane calcined product-metal oxide complex will be described.

For achieving a battery having the high capacity, a large amount of current is essential to be charged and discharged, and therefore a material having low electric resistance is demanded in an electrode.

Accordingly, complexing or covering the silicon nanoparticle-containing hydrogen polysilsesquioxane calcined product-metal oxide complex with a carbon-based material is also an aspect of the present invention.

In order to complex or cover the calcined product with the carbon-based material, a method of dispersing the silicon nanoparticle-containing hydrogen polysilsesquioxane calcined product-metal oxide complex with the carbon-based material by a mechanical mixing method using mechanofusion or a ball mill and a vibrating mill or the like.

Specific examples of the carbon-based material preferably include a carbon-based material such as graphite, carbon black, fullerene, carbon nanotube, carbon nanofoam, pitch carbon fibers, polyacrylonitrile carbon fiber and amorphous carbon.

The silicon nanoparticle-containing hydrogen polysilsesquioxane calcined product-metal oxide complex can be complexed or covered with the carbon-based material at an arbitrary proportion.

<Negative Electrode>

The negative electrode in a lithium ion secondary battery is produced using the negative electrode active material containing the silicon nanoparticle-containing hydrogen polysilsesquioxane calcined product-metal oxide complex or the silicon nanoparticle-containing hydrogen polysilsesquioxane calcined product-metal oxide complex which is complexed or covered with the carbon-based material.

As a negative electrode, for example, the negative electrode active material containing the silicon nanoparticle-containing hydrogen polysilsesquioxane calcined product-metal oxide complex or the silicon nanoparticle-containing hydrogen polysilsesquioxane calcined product-metal oxide complex which is complexed or covered with the carbon-based material, and a negative electrode mixture containing the binder may be shaped into a predetermined form, and the negative electrode may be produced by a method of applying the negative electrode mix material to a current collector such as a copper foil. A method for forming a negative electrode is not particularly limited, and a conventional method can be used.

More specifically, for example, a negative electrode plate is obtained by preparing a negative electrode material composition containing the negative electrode active material containing the silicon nanoparticle-containing hydrogen polysilsesquioxane calcined product-metal oxide complex or the silicon nanoparticle-containing hydrogen polysilsesquioxane calcined product-metal oxide complex which is complexed with the carbon-based material, the binder, and optionally a conductive material etc., and then directly coating the resulting material etc., on the current collector in a rod-shaped body, a plate-shaped body, a foil-shaped body, a net-shaped body etc. mainly containing copper, nickel, stainless steel etc., or separately casting the negative electrode material composition on a support and laminating a negative electrode active material film exfoliated from the support on the current collector. Moreover, the negative electrode of the present invention is not limited to the forms described above, and can also be obtained in a form other than the forms described above.

As a binder, any binder can be used in the present invention as long as the binder can be generally used in a secondary battery and has a functional group such as the COO⁻ group having interaction with the Si—H bond on the negative electrode active material. Specific examples thereof include carboxymethylcellulose, polyacrylic acid, alginic acid, glucomannan, amylose, saccharose, derivative or polymer thereof, alkali metal salt thereof, and polyimide resin and polyimideamide resin. The binder may be used alone, or in the form of a mixture thereof. Furthermore, a component providing another function, for example, improvement in binding properties with a current collector, improvement in dispersibility and improvement in conductivity of the binder itself, for Example, a styrene-butadiene rubber-based polymer or a styrene isoprene rubber-based polymer may be added and mixed.

<Lithium Ion Battery>

A lithium ion battery using the negative electrode active material formed by containing the silicon nanoparticle-containing hydrogen polysilsesquioxane calcined product-metal oxide complex of the present invention can be produced as follows.

At first, a positive electrode active material that can reversibly insert and remove a lithium ion, a conductive agent, a binder and a solvent are mixed to prepare a positive electrode active material composition. In the manner similar to the negative electrode, according to a publicly known method, the positive electrode active material composition is directly coated on a metal current collector and dried to produce a positive plate.

A positive electrode can also be produced by separately casting the positive electrode active material composition on the support, and then laminating the film exfoliated from the support on the metal current collector. A method for shaping the positive electrode is not particularly limited, and a conventional method can be used.

The positive electrode active material is not particularly limited as long as the material is a lithium metal complex oxide, and is generally used in a field of the secondary battery. Specific examples include lithium cobalt oxide, lithium nickel oxide, lithium manganese oxide having a spinel structure, a lithium cobalt manganese oxide, an iron phosphate having an olivine structure, so-called a ternary lithium metal complex oxide and a nickel lithium metal complex oxide. Moreover, $V_2O_5$, TiS, MoS and the like which are compounds allowing desorption and insertion of the lithium ion, can also be used.

A conductive agent is not particularly limited and any conductive agent may be used, as long as the agent is an electron conductive material generally used in a lithium ion battery and does not decompose or deteriorate in the configured battery. Specific examples include carbon black such as acetylene black, graphite fine particles, vapor phase epitaxial carbon fibers and a combination of two or more thereof. Moreover, specific examples of the binder include vinylidene fluoride-hexafluoropropylene copolymer, polyvinylidene fluoride (PVDF), polyacrylonitrile, polymethylmethacrylate, polytetrafluoroethylene and mixture thereof, and styrene-butadiene rubber polymer, but the binder is not limited thereto. In addition, specific examples of the solvent include N-methyl pyrrolidone, acetone and water, but the solvent is not limited thereto.

The content ratios of the positive electrode active material, the conductive agent, the binder and the solvent is ratios which can be generally used in the lithium ion battery.

A separator interposed between the positive electrode and the negative electrode is not particularly limited, as long as the separator is generally used in the lithium ion battery. The separator having low resistance to ion transfer of an electrolyte, or excellent electrolyte impregnation ability is preferred.

Specific examples include a material selected from glass fibers, polyester, polyethylene, polypropylene, polytetrafluoroethylene, polyimide or compounds thereof, and the material may be in the form of a nonwoven fabric or a woven fabric.

More specifically, in the case of a lithium ion battery, using a windable separator made of a material such as polyethylene or polypropylene is preferred, and in the case of a lithium ion polymer battery, using a separator excellent in organic electrolyte impregnation ability is preferred.

As the electrolyte, one or a mixture of two or more of electrolytes including lithium salt such as lithium hexafluorophosphate, lithium tetrafluoroborate, lithium hexaantimony, lithium hexafluoroarsenate, lithium perchlorate, lithium trifluoromethanesulfonate, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, x and y are a natural number), LiCl and LiI dissolved in a solvent such as propylene carbonate, ethylene carbonate, dimethyl carbonate, diethyl carbonate, ethylmethyl carbonate, methylpropyl carbonate, butylene carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene or diethyl ether or a mix solvent thereof can be used.

Moreover, various nonaqueous electrolyte other than the above or solid electrolytes can also be used. For example, various ionic liquids to which a lithium ion is added, a pseudo solid electrolyte in which the ionic liquid and fine powder are mixed, a lithium ion conductive solid electrolyte, or the like can be used.

Furthermore, for the purpose of improving charge-discharge cycle properties, a compound that promotes stable film formation on a surface of the negative electrode active material can be appropriately contained in the electrolyte described above. For example, vinylene carbonate (VC), fluorobenzene, fluorinated carbonate such as cyclic fluorinated carbonate (such as fluoroethylene carbonate (FEC), trifluoropropylene carbonate (TFPC) etc.) and chain fluorinated carbonate (such as trifluorodimethyl carbonate (TFDMC), trifluorodiethyl carbonate (TFDEC) and trifluoroethyl methyl carbonate (TFEMC) etc.) are effective. In addition, cyclic fluorinated carbonate and chain fluorinated carbonate can also be used as a solvent such as ethylene carbonate.

A separator is disposed between a positive electrode plate and a negative electrode plate as described above to form a battery structure. If such a battery structure is wound or folded and then incorporated into a cylindrical battery case or a square battery case. After that, the electrolyte is injected thereto, and the lithium ion battery is completed.

After the battery structures are laminated into a bicell structure, and impregnated into an organic electrolyte, and the thus obtained product is put into a pouch and sealed, and then the lithium ion polymer battery is completed.

In the present invention, in one aspect of the silicon nanoparticle-containing hydrogen polysilsesquioxane calcined product-metal oxide complex, the silicon nanoparticle-containing hydrogen polysilsesquioxane calcined product used for the silicon nanoparticle-containing hydrogen polysilsesquioxane calcined product-metal oxide complex has features that, as shown in FIG. 1, in the spectrum measured by the infrared spectroscopy, when the intensity of the maximum absorption peak (peak 1) within the absorption band in 820 to 920 $cm^{-1}$ derived from the Si—H bond is $I_1$, and the intensity of the maximum absorption peak (peak 2) within the absorption band in 1000 to 1250 $cm^{-1}$ derived from the Si—O—Si bond is $I_2$, the ratio ($I_1/I_2$) is in the range of 0.01 to 0.35, and is represented by the general formula $SiO_xH_y$ ($0.01<x<1.35$, $0<y<0.35$), as shown in elemental analysis values in Table 1. The lithium ion battery produced by using the negative electrode active material containing the silicon nanoparticle-containing hydrogen polysilsesquioxane calcined product-metal oxide complex having the above features exhibits high capacity, good initial charge-discharge efficiency and excellent cycle properties.

In one aspect of the silicon nanoparticle-containing hydrogen polysilsesquioxane calcined product-metal oxide complex, the silicon nanoparticle-containing hydrogen polysilsesquioxane calcined product used for the silicon nanoparticle-containing hydrogen polysilsesquioxane calcined product-metal oxide complex has features that, in the spectrum measured by the infrared spectroscopy, within an absorption band in 1000 to 1250 $cm^{-1}$ derived from the Si—O—Si bond, when an intensity of a maximum absorption peak (peak 2-1) in a wavelength of 1100 $cm^{-1}$ or higher is $I_{2-1}$ and an intensity of a maximum absorption peak (peak 2-2) in a wavelength of 1100 $cm^{-1}$ or lower is $I_{2-2}$, the intensity ratio ($I_{2-1}/I_{2-2}$) of the silicon nanoparticle-containing hydrogen polysilsesquioxane calcined product is preferably greater than 1. The above features are similar to the features of the silicon nanoparticle-containing hydrogen polysilsesquioxane which is a precursor of the silicon nanoparticle-containing hydrogen polysilsesquioxane calcined product. The proportion of the cyclization bond is almost maintained ever after heat treatment, and therefore the state of $I_{2-1}/I_{2-2}>1$ is also maintained.

In such a silicon nanoparticle-containing hydrogen polysilsesquioxane calcined product, the surface of the silicon nanoparticles and the silicon oxide structure (derived from hydrogen polysilsesquioxane) form a network through the strong chemical bond (the Si—O—Si bond) are indicated. The network is held even after the calcination, and a structure of the silicon oxide structure part plays a role of a buffer layer against the expansion and contraction of the silicon nanoparticles, and as a result, pulverization of the silicon nanoparticles caused by repeating the charge-discharge is expected to be suppressed.

EXAMPLES

Hereinafter, the present invention will be described more specifically by describing Examples and Comparative Examples, but the present invention is not limited to the Examples.

Various analyses and evaluations were conducted on some samples prepared in Examples and Comparative Examples.

Devices and measuring methods used in "Measurement by Infrared Spectroscopy", "Measurement by Elemental Analysis", "Analysis of Titanium Oxide Covering Layer" and "Evaluation of Battery Properties" in each Examples and Comparative Examples are as described below.

(Measurement by Infrared Spectroscopy)

With regard to measurement by the infrared spectroscopy, the measurement was carried out by using a Nicolet iS5 FT-IR made by Thermo Fisher Scientific K.K. as an infrared spectrometer, in transmission measurement by a KBr method (resolution: 4 $cm^{-1}$, the number of times of scans: 16 times, data interval: 1.928 $cm^{-1}$, detector: DTGS KBr) on an intensity ($I_1$) of peak 1 in 820 to 920 $cm^{-1}$ derived from the Si—H bond and an intensity ($I_2$) of peak 2 in 1000 to 1250 $cm^{-1}$ derived from the Si—O—Si bond. In addition, each peak intensity was determined by connecting the starting point and the end point of a target peak by a straight line, partially correcting a baseline, and then measuring a height from the baseline to a peak top. Because peaks derived from the Si—O—Si bond existed in two places, the peaks were separated, and the intensity of the peak at about 1170 $cm^{-1}$ was specified as $I_{2-1}$, and the intensity of the peak at about 1070 cm$^{-1}$ was specified as $I_{2\text{-}2}$, and the intensity of the peak having higher intensity in the two peaks was specified as $I_2$.

(Measurement by Elemental Analysis)

The elemental composition analysis was conducted with a Rutherford back scattering spectrometry (RBS)-hydrogen forward scattering spectrometry (HFS) method capable of obtaining a high-accuracy composition value including hydrogen by compacting sample powder into a pellet form, irradiating the sample with the helium ion accelerated to 2.3 MeV, and analyzing an energy spectrum of back scattered particles and an energy spectrum of a forward scattered hydrogen atom. The contents of the silicon atom, the oxygen atom and the titanium atom were measured by the RBS spectral analysis, and the content of the hydrogen atom was measured by analyzing the spectrums of the RBS and the HFS. The content of titanium oxide was calculated by multiplying by 1.67 (TiO$_2$/Ti=79.87/47.87=1.67) under assumption that all titanium exists as titanium dioxide.

The measurement was carried out under the conditions of incident ion: 2.3 MeV He, incident angle during RBS/HFS simultaneous measurement: 75 degrees, scattering angle: 160 degrees, sample current: 4 nA and beam diameter: 2 mmφ by using Pelletron 3SDH made by National Electrostatics Corporation, as a device for measurement.

(Analysis of Titanium Oxide Covering Layer)

The analysis of the titanium oxide covering layer was carried out by using an X-rays photoelectron spectroscopic analysis device PHI Quanera SXM [ULVAC-PHI]under the conditions using AlKα which is made monochromatic to an X-ray source, output of 15 kV/25 W and beam diameter of 100 μmφ, to identify the state of the complex from the position and the shape of peaks derived from Ti2p and O1s.

(Evaluation of Battery Properties)

A lithium ion battery was produced by using the negative electrode active material containing a sample of the Examples or the Comparative Examples, and the charge-discharge properties of the battery were measured as described below.

By using a BTS 2005W made by NAGANO & Co., Ltd., the constant current charge was carried out on a Li electrode at a current of 100 mA per 1 g of the silicon nanoparticle-containing hydrogen polysilsesquioxane calcined product-metal oxide complex to reach a voltage of 0.001 V and then the constant voltage charge was carried out by maintaining a voltage of 0.001 V to reach a current value equal to or less than 20 mA per 1 g of the active material.

After a rest period of about 30 minutes, on the completely charged cell, the constant current discharge was carried out at a current of 100 mA per 1 g of the active material to reach a voltage of 1.5 V.

The charge capacity was calculated from an integral current value until the constant voltage charge was ended, and the discharge capacity was calculated from an integral current value until a battery voltage reached 1.5 V, and a value obtained by dividing the first discharge capacity by the first charge capacity, which is expressed in terms of percentage, was taken as an initial charge-discharge efficiency. At the time of switching the charge-discharge, the conditions of an open circuit for 30 minutes were kept without any actions.

The charge-discharge cycle performance was also measured under the similar conditions.

The charge-discharge efficiency was taken as a ratio of the discharge capacity to the first charge capacity (the first cycle of the charge-discharge), and capacity maintenance rate was taken as a ratio of discharge capacity at the 100th cycle of the charge-discharge to the first discharge capacity.

Example 1

(Preparation of Silicon Nanoparticle-Containing Hydrogen Polysilsesquioxane Powder (1))

In a 50 mL poly beaker, 20 g of pure water and 1.92 g of silicon nanopowder (Sigma-Aldrich Corp., less than 100 nm (volume-basis mean particle size; the size was more than 10 nm.)) were put to prepare aqueous silicon nanoparticle dispersion by using an ultrasonic cleaning bath. Into a 500 mL three-neck flask, the silicon nanoparticle dispersion, 2.43 g (24 mmol) of 36% by weight (concentration) hydrochloric acid and 218.6 g of pure water were added, the silicon nanoparticles were dispersed with stirring at room temperature for 10 minutes, and 45 g (274 mmol) of a triethoxysilane (Tokyo Chemical Industry Co., Ltd.) was added dropwise thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 μm, hydrophilic) to collect a solid. The solid obtained was dried under reduced pressure at 80° C. for 10 hours to obtain 16.4 g of a silicon nanoparticle-containing hydrogen polysilsesquioxane powder (1).

(Preparation of Silicon Nanoparticle-Containing Hydrogen Polysilsesquioxane Calcined Product (1))

On an alumina boat of an SSA-S grade, 10.0 g of the silicon nanoparticle-containing hydrogen polysilsesquioxane powder (1) in Example 1 was placed, and then the boat was set in a vacuum purging tube furnace KTF43N1-VPS (Koyo Thermo Systems Co., Ltd.). Then, as heat treatment conditions, while argon gas was fed at a flow rate of 250 mL per minute under the argon gas atmosphere (high-purity argon gas: 99.999%), and the temperature was raised at a rate of 4° C. per minute, and calcination was carried out at 900° C. for 1 hour to obtain a silicon nanoparticle-containing hydrogen polysilsesquioxane calcined product.

Then, the silicon nanoparticle-containing hydrogen polysilsesquioxane calcined product was ground and crushed with a mortar for 5 minutes, and the resulting material was classified using a stainless steel sieve having an opening of 32 μm to obtain 9.58 g of a silicon nanoparticle-containing hydrogen polysilsesquioxane calcined product (1) having a maximum particle size of 32 μm.

(Titanium Oxide Covering Formation Treatment)

The silicon nanoparticle-containing hydrogen polysilsesquioxane calcined products (1) 9.5 g were added into 200 mL of an eggplant shaped flasks which are filled with 45 mL of an ethanol (Wako Pure Chemical Industries, Ltd.: special grade reagent), and then dispersed by an ultrasonic bath for 3 minutes and by a magnetic stirrer for 5 minutes. After the dispersion treatment, 1.78 g of a tetraisopropoxy titanate (titanium tetraisopropoxide, Alfa Aesar 95% reagent) were added dropwise with stirring, and then stirring was kept for 1.5 hours under room temperature. In 1.5 hours, stirring was stopped and the mixture was concentrated by using an evaporator. After the solvent was evaporated, the flask was moved into a reduced-pressure drier, and reduced-pressure drying was conducted at 60° C. for 1 hour to obtain a silicon nanoparticle-containing hydrogen polysilsesquioxane calcined product-titanium oxide complex precursor powder (1).

(Preparation of Silicon Nanoparticle-Containing Hydrogen Polysilsesquioxane Calcined Product-Titanium Oxide Complex (1))

Figures 2A, 2B:
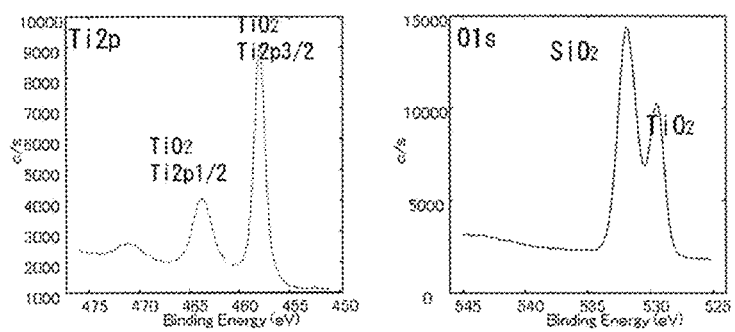
FIG. 2(a) and FIG. 2(b) show spectra of the silicon nanoparticle-containing hydrogen polysilsesquioxane calcined product-titanium oxide complex (1) obtained in Example 1, which was measured by an X-ray photoelectron spectroscopy.

In a manner similar to the preparation of the silicon oxide, the silicon nanoparticle-containing hydrogen polysilsesquioxane calcined product-titanium oxide complex precursor powder (1) was set to a vacuum purging tube furnace KTF43N1-VPS under heat treatment. In heat treatment conditions, while argon gas was added in a flow rate of 250 mL/min and the temperature is increased at a rate of 4° C./min, the calcination was conducted at 400° C. for 1 hour under the argon gas atmosphere. The crushing with a mortar and the classification with a stainless sieve were carried out, and then, 9.8 g of the silicon nanoparticle-containing hydrogen polysilsesquioxane calcined product-titanium oxide complex (1) having a maximum particle size of 32 μm was obtained. The surface analysis was carried out using an X-rays photoelectron spectrum device to determine the state of the titanium of the silicon nanoparticle-containing hydrogen polysilsesquioxane calcined product-titanium oxide complex (1), as a result, it was confirmed that the titanium was bonded to the surface as the state of the titanium oxide. Spectrums of Ti2p and O1s of the X-rays photoelectron spectroscopic analysis are shown in FIG. 2(a) and FIG. 2(b).

(Preparation of Negative Electrode)

To 20 g of a 2% by weight carboxymethyl cellulose aqueous solution, 3.2 g of the silicon nanoparticle-containing hydrogen polysilsesquioxane calcined product-titanium oxide complex (1) and 0.4 g of acetylene black made by Denka Company Limited were added and mixed for 15 minutes using a stirrer in the flask, and then distilled water was added so as for the solid content concentration to be 15% by weight, and the resultant mixture was further stirred for 15 minutes to prepare a slurry composition. The slurry composition was transferred to a thin-film spin system high-speed mixer (FILMIX Model 40-40) made by PRIMIX Corporation, and was stirred and dispersed at a rotation speed of 20 m/s for 30 seconds. The slurry obtained after the dispersion treatment was coated on a copper foil roll so as to be a thickness of 200 μm by a doctor blade method.

After coating, the resultant material was dried for 90 minutes on a hot plate at 80° C. After drying, a negative electrode sheet was pressed by a 2-ton small precision roll press (THANK-METAL Co., LTD.). After the press, the electrode sheet was punched with an electrode punch HSNG-EP having φ14.5 mm, and then was dried under a reduced pressure at 80° C. for 16 hours in a glass tube oven GTO-200 (SIBATA SCIENTIFIC TECHNOLOGY LTD.) to manufacture a negative electrode.

(Production and Evaluation of Lithium Ion Secondary Battery)

Figure 4:
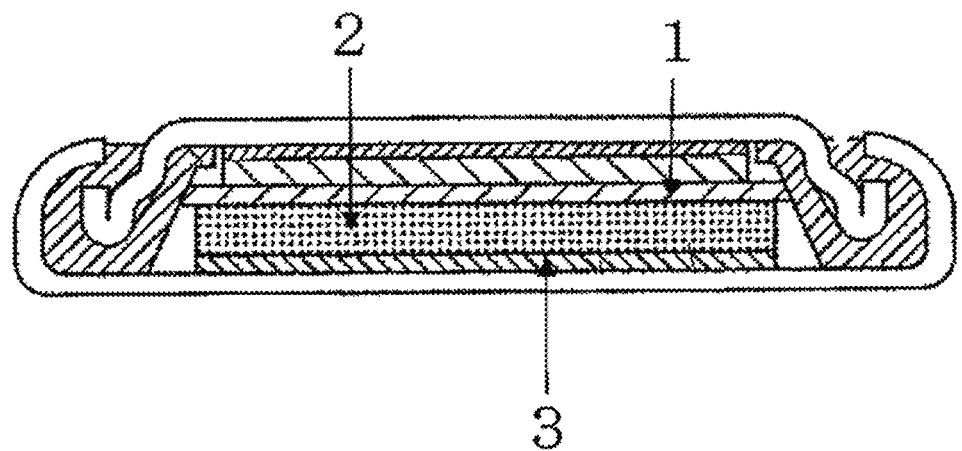
FIG. 4 is a diagram showing a configuration example of a coin-type lithium ion cell.

A 2032 type coin cell having a structure shown in FIG. 4 was produced. The negative electrode obtained above, a lithium metal and a microporous polypropylene film were used as negative electrode 1, counter electrode 3 and separator 2, respectively. An electrolyte prepared by adding 5% by weight of a fluoroethylene carbonate (FEC) to a mixed solvent of ethylene carbonate and diethyl carbonate of 1:1 (volume ratio) in which $LiPF_6$ were dissolved at a rate of 1 mol/L was used.

Then, the battery properties of the lithium ion secondary battery were evaluated by the methods described above. The results are shown in Table 1.

Example 2

(Preparation of Silicon Nanoparticle-Containing Hydrogen Polysilsesquioxane Powder (2))

In a 500 mL poly beaker, 200 g of pure water and 19.2 g of a silicon nanopowder (Sigma-Aldrich Corp., less than 100 nm; volume-basis mean particle size, (The particle size was more than 10 nm.) were added to prepare a silicon nanoparticle dispersed aqueous solution by using an ultrasonic cleaning bath. Into a 3 L separable flask, the aqueous silicon nanoparticle dispersion, 12.2 g (120 mmol) of 36% by weight (concentration) hydrochloric acid, and 0.94 kg of pure water were charged, and the resulting mixture was stirred at room temperature for 10 minutes to wholly disperse silicon nanoparticles therein, and 167 g (1.37 mol) of a trimethoxysilane (Tokyo Chemical Industry Co., Ltd.) was added dropwise thereto at 25° C. under stirring. After completion of dropwise addition, the hydrolysis reaction and the condensation reaction were carried out at 25° C. for 2 hours while the mixture was stirred.

After elapse of a reaction time, reaction products were filtrated by a membrane filter (pore size: 0.45 μm, hydrophilic) to collect a solid. The solid obtained was dried under a reduced pressure at 80° C. for 10 hours to obtain 95.2 g of a silicon nanoparticle-containing hydrogen polysilsesquioxane powder (2).

(Preparation of Silicon Nanoparticle-Containing Hydrogen Polysilsesquioxane Calcined Product (2))

In a manner which is the same as Example 1, a silicon nanoparticle-containing hydrogen polysilsesquioxane calcined product (2) was prepared by using the silicon nanoparticle-containing hydrogen polysilsesquioxane powder (2).

(Preparation of Silicon Nanoparticle-Containing Hydrogen Polysilsesquioxane Calcined Product-Titanium Oxide Complex (2))

A silicon nanoparticle-containing hydrogen polysilsesquioxane calcined product-titanium oxide complex (2) was obtained by using the silicon nanoparticle-containing hydrogen polysilsesquioxane calcined product (2), and conducting titanium oxide covering and heat treatment in the manner which is the same as Example 1 in which the silicon nanoparticle-containing hydrogen polysilsesquioxane calcined product (1) was used.

(Preparation of Negative Electrode, and Preparation and Evaluation of Lithium Ion Battery)

A negative electrode was produced by using the silicon nanoparticle-containing hydrogen polysilsesquioxane calcined product-titanium oxide complex (2) in the manner which is the same as Example 1 in which the silicon nanoparticle-containing hydrogen polysilsesquioxane calcined product-titanium oxide complex (1) was used, and the battery properties of a lithium ion battery including the negative electrode were evaluated.

Example 3

(Preparation of Silicon Nanoparticle-Containing Hydrogen Polysilsesquioxane Powder (3))

A silicon nanoparticle-containing hydrogen polysilsesquioxane powder (3) was obtained in the manner which is the same as Example 2 except that a charging amount of silicon nanopowder (Sigma-Aldrich Corp., less than 100 nm; volume-basis mean particle size, The particle size was more than 10 nm) was changed to 77.0 g in preparation of the silicon nanoparticle-containing hydrogen polysilsesquioxane.

(Preparation of Silicon Nanoparticle-Containing Hydrogen Polysilsesquioxane Calcined Product (3))

A Silicon nanoparticle-containing hydrogen polysilsesquioxane calcined product (3) was prepared by using the silicon nanoparticle-containing hydrogen polysilsesquioxane powder (3) in the manner which is the same as Example 1. The infrared spectroscopy spectrum of the silicon nanoparticle-containing hydrogen polysilsesquioxane calcined product (3) are shown in FIG. 1 (represented as Example 3 in FIG. 1).

(Preparation of Silicon Nanoparticle-Containing Hydrogen Polysilsesquioxane Calcined Product-Titanium Oxide Complex (3))

A Silicon nanoparticle-containing hydrogen polysilsesquioxane calcined product-titanium oxide complex (3) was obtained by using the silicon nanoparticle-containing hydrogen polysilsesquioxane calcined product (3) and conducting titanium oxide covering and heat treatment in the manner which is the same as Example 2 in which the silicon nanoparticle-containing hydrogen polysilsesquioxane calcined product (2) was used.

(Preparation of Negative Electrode, and Preparation and Evaluation of Lithium Ion Battery)

A negative electrode was produced by using the silicon nanoparticle-containing hydrogen polysilsesquioxane calcined product-titanium oxide complex (3) in the manner which is the same as Example 1 in which the silicon nanoparticle-containing hydrogen polysilsesquioxane calcined product-titanium oxide complex (1) was used, and the battery properties of a lithium ion battery including the negative electrode were evaluated.

Example 4

(Production of Silicon Nanoparticle-Containing Hydrogen Polysilsesquioxane Calcined Product-Titanium Oxide Complex (4))

Figure 3:
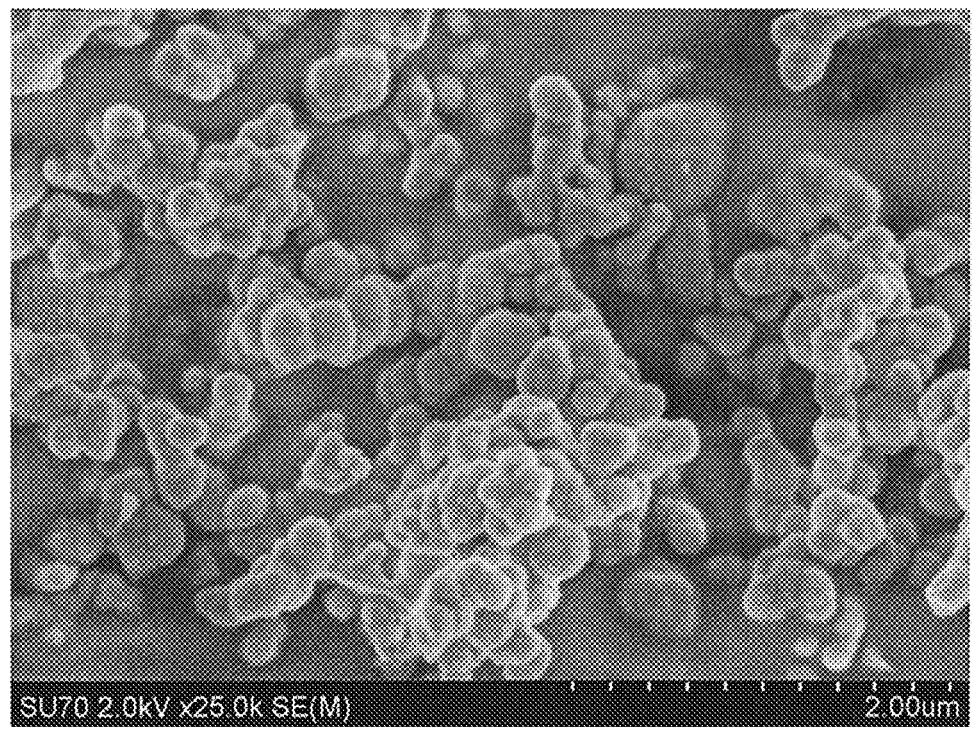
FIG. 3 shows a photograph of a scanning electronic microscope (SEM) of the silicon nanoparticle-containing hydrogen polysilsesquioxane calcined product-titanium oxide complex (4) obtained in Example 4.

A silicon nanoparticle-containing hydrogen polysilsesquioxane calcined product-titanium oxide complex (4) was obtained by conducting the titanium oxide covering and heat treatment using a silicon nanoparticle-containing hydrogen polysilsesquioxane powder (3) in the manner which is the same as Example 1 except that a charging amount of a tetraisopropoxy titanate (titanium tetraisopropoxide, Alfa Aesar 95% reagent) was changed to 0.87 g. A photograph of the silicon nanoparticle-containing hydrogen polysilsesquioxane calcined product-titanium oxide complex (4) by an electronic microscope (SEM) is shown in FIG. 3.

(Preparation of Negative Electrode, and Production and Evaluation of Lithium Ion Battery)

A negative electrode was produced by using the silicon nanoparticle-containing hydrogen polysilsesquioxane calcined product-titanium oxide complex (4) in the manner which is the same as Example 1 in which the silicon nanoparticle-containing hydrogen polysilsesquioxane calcined product-titanium oxide complex (1) was used, and the battery properties of a lithium ion battery including the negative electrode were evaluated.

Example 5

(Production of Silicon Nanoparticle-Containing Hydrogen Polysilsesquioxane Calcined Product-Titanium Oxide Complex (5))

A silicon nanoparticle-containing hydrogen polysilsesquioxane calcined product-titanium oxide complex (5) was obtained by conducting the titanium oxide covering and heat treatment using a silicon nanoparticle-containing hydrogen polysilsesquioxane powder (3) in the manner which is the same as Example 1 except that a charging amount of a tetraisopropoxy titanate (titanium tetraisopropoxide, Alfa Aesar 95% reagent) was changed to 2.54 g.

(Production of Negative Electrode, and Preparation and Evaluation of Lithium Ion Battery)

A negative electrode was produced by using the silicon nanoparticle-containing hydrogen polysilsesquioxane calcined product-titanium oxide complex (5) in the manner which is the same as Example 1 in which the silicon nanoparticle-containing hydrogen polysilsesquioxane calcined product-titanium oxide complex (1) was used, and the battery properties of a lithium ion battery including the negative electrode were evaluated.

Example 6

(Preparation of Silicon Nanoparticle-Containing Hydrogen Polysilsesquioxane Powder (4))

A silicon nanoparticle-containing hydrogen polysilsesquioxane powder (4) was obtained in the manner which is the same as Example 2 except that a dripping amount of the trimethoxysilane (Tokyo Chemical Industry Co., Ltd.) was changed to 23.9 g in preparation of the silicon nanoparticle-containing hydrogen polysilsesquioxane.

(Preparation of Silicon Nanoparticle-Containing Hydrogen Polysilsesquioxane Calcined Product (4))

A Silicon nanoparticle-containing hydrogen polysilsesquioxane calcined product (4) was prepared by using the silicon nanoparticle-containing hydrogen polysilsesquioxane powder (4) in the manner which is the same as Example 1.

(Preparation of Silicon Nanoparticle-Containing Hydrogen Polysilsesquioxane Calcined Product-Titanium Oxide Complex (6))

A silicon nanoparticle-containing hydrogen polysilsesquioxane calcined product-titanium oxide complex (6) was obtained by using the silicon nanoparticle-containing hydrogen polysilsesquioxane calcined product (4) and conducting titanium oxide covering and heat treatment in the manner which is the same as Example 1 in which the silicon nanoparticle-containing hydrogen polysilsesquioxane calcined product (1) was used.

(Production of Negative Electrode, and Preparation and Evaluation of Lithium Ion Battery)

A negative electrode was produced by using the silicon nanoparticle-containing hydrogen polysilsesquioxane calcined product-titanium oxide complex (6) in the manner which is the same as Example 1 in which the silicon nanoparticle-containing hydrogen polysilsesquioxane calcined product-titanium oxide complex (1) was used, and the battery properties of a lithium ion battery including the negative electrode were evaluated.

Comparative Example 1

(Preparation of Silicon Nanoparticle-Containing Hydrogen Polysilsesquioxane Calcined Product (5))

A silicon nanoparticle-containing hydrogen polysilsesquioxane calcined product (5) was obtained in the manner which is the same as Example 3 except that the calcination temperature in heat treatment was adjusted to 1100° C. in preparation of the silicon nanoparticle-containing hydrogen polysilsesquioxane calcined product. The results of the infrared spectroscopy measurement of the silicon nanoparticle-containing hydrogen polysilsesquioxane calcined product (5) are shown in FIG. 1, the results of the elemental analysis are shown in Table 1 (represented as Comparative Example 1 in FIG. 1).

(Production of Silicon Nanoparticle-Containing Hydrogen Polysilsesquioxane Calcined Product-Titanium Oxide Complex (7))

A silicon nanoparticle-containing hydrogen polysilsesquioxane calcined product-titanium oxide complex (7) was obtained by using the silicon nanoparticle-containing hydrogen polysilsesquioxane calcined product (5) and conducting titanium oxide covering and heat treatment in the manner which is the same as Example 1 in which the silicon nanoparticle-containing hydrogen polysilsesquioxane calcined product (1) was used.

(Preparation of Negative Electrode, and Preparation and Evaluation of Lithium Ion Battery)

A negative electrode was obtained by using the silicon nanoparticle-containing hydrogen polysilsesquioxane calcined product-titanium oxide complex (7) in the manner which is the same as Example 1 in which the silicon nanoparticle-containing hydrogen polysilsesquioxane calcined product-titanium oxide complex (1) was used, and the battery properties of a lithium ion including the negative electrode were evaluated. The results of the battery property evaluation are shown in Table 1.

Comparative Example 2

(Preparation of Silicon Nanoparticle-Containing Hydrogen Polysilsesquioxane Calcined Product (6))

A silicon nanoparticle-containing hydrogen polysilsesquioxane calcined product (6) was obtained in the manner which is the same as Example 3 except that the calcination temperature in heat treatment was adjusted to 500° C. in preparation of the silicon nanoparticle-containing hydrogen polysilsesquioxane calcined product. The results of the infrared spectroscopy measurement of the silicon nanoparticle-containing hydrogen polysilsesquioxane calcined product (6) are shown in FIG. 1, the results of the elemental analysis are shown in Table 1 (represented as Comparative Example 2 in FIG. 1).

(Production of Silicon Nanoparticle-Containing Hydrogen Polysilsesquioxane Calcined Product-Titanium Oxide Complex (8))

A Silicon nanoparticle-containing hydrogen polysilsesquioxane calcined product-titanium oxide complex (8) was obtained by using the silicon nanoparticle-containing hydrogen polysilsesquioxane calcined product (6) and conducting the titanium oxide covering and heat treatment in the manner which is the same as Example 1 in which the silicon nanoparticle-containing hydrogen polysilsesquioxane calcined product (1) was used. The results of the battery property evaluation are shown in Table 1

(Preparation of Negative Electrode, and Preparation and Evaluation of Lithium Ion Battery)

A negative electrode was produced by using the silicon nanoparticle-containing hydrogen polysilsesquioxane calcined product-titanium oxide complex (8) in the manner which is the same as Example 1 in which the silicon nanoparticle-containing hydrogen polysilsesquioxane calcined product-titanium oxide complex (1) was used, and the battery properties of a lithium ion battery including the negative electrode were evaluated.

Comparative Example 3

A silicon monoxide powder having a maximum particle size of 32 μm by classifying commercially available silicon monoxide (Sigma-Aldrich Corp., under 325 mesh) by using a stainless steel sieve having an opening of 32 μm was used as a silicon oxide.

The results of the infrared spectroscopy measurement and the element analysis of the used silicon monoxide are shown in Table 1. A negative electrode was produced by conducting out the titanium oxide covering in the manner which is the same as Example 1 except that the above silicon monoxide was used instead of the silicon nanoparticle-containing hydrogen polysilsesquioxane calcined product (1). A lithium ion secondary battery was produced in the manner which is the same as Example 1 except that the obtained negative electrode was used, and the battery properties having the negative electrode were evaluated. The results of the battery properties evaluation are shown in Table 1.

The results of the elemental analysis and the battery properties evaluation in which the negative electrode including each negative electrode active material was adopted in Examples 1 to 6 and Comparative Examples 1 to 3 of the present invention are shown in Table 1.

TABLE 1

| | Thermal Treatment Temperature | Silicon Oxide Element Analysis (Mole Ratio) | | | IR Peak Ratio | | $TiO_2$ Content | Initial Charge Capacity | Initial Discharge Capacity | Discharge Capacity at 100th Cycle | Initial Charge-Discharge Efficiency | Capacity Maintenance Rate |
|---|---|---|---|---|---|---|---|---|---|---|---|---|
| | ° C. | Si | O | H | $I_1/I_2$ | $I_{2-1}/I_{2-2}$ | wt % | mAh/g | mAh/g | mAh/g | % | % |
| Example 1 | 900 | 1.00 | 1.22 | 0.08 | 0.05 | 1.12 | 4.9 | 1890 | 1362 | 1268 | 72.1 | 93.1 |
| Example 2 | 900 | 1.00 | 1.03 | 0.09 | 0.06 | 1.15 | 5.0 | 2027 | 1506 | 1389 | 74.3 | 92.2 |
| Example 3 | 900 | 1.00 | 0.50 | 0.10 | 0.05 | 1.18 | 5.1 | 2601 | 2234 | 2004 | 85.9 | 89.7 |
| Example 4 | 900 | 1.00 | 0.50 | 0.10 | 0.05 | 1.18 | 2.5 | 2590 | 2152 | 1953 | 83.1 | 90.8 |
| Example 5 | 900 | 1.00 | 0.50 | 0.10 | 0.05 | 1.18 | 6.9 | 2579 | 2256 | 1986 | 87.5 | 88.0 |
| Example 6 | 900 | 1.00 | 0.20 | 0.06 | 0.06 | 1.3 | 4.8 | 3092 | 2789 | 2421 | 90.2 | 86.8 |
| Comparative Example 1 | 1100 | 1.00 | 0.51 | 0.00 | 0 | 1.14 | 5.0 | 652 | 527 | 512 | 80.8 | 97.2 |
| Comparative Example 2 | 500 | 1.00 | 0.50 | 0.45 | 0.45 | 1.01 | 5.0 | 2338 | 1718 | 1574 | 73.5 | 91.6 |
| Comparative Example 3 | 900 | 1.00 | 1.05 | 0 | 0 | 0.77 | 5.2 | 2150 | 1521 | 380 | 70.7 | 25.0 |

According to the results of the Examples described above, the silicon nanoparticle-containing hydrogen polysilsesquioxane calcined product-metal oxide complex produced by covering with titanium oxide the calcined product obtained by heat-treatment to the silicon nanoparticle-containing hydrogen polysilsesquioxane having a new structure having a suitable amount of the Si—H bond and a chemical bond between a surface of the silicon nanoparticles and the hydrogen polysilsesquioxane have higher initial capacity and discharge capacity at the 100th cycles than a conventional carbon negative electrode active material, and reduction of decreased capacity and high capacity maintenance rate, which indicates the excellent charge-discharge cycle properties i.e. the deterioration in the charge-discharge cycle were extremely suppressed, and therefore, the negative electrode active material can be practically used as a negative electrode material.

The silicon nanoparticle-containing hydrogen polysilsesquioxane calcined product obtained by calcination at a temperature more than 1000° C. shown in Comparative Example 1 did not have a suitable amount of the Si—H bond, and the silicon nanoparticle-containing hydrogen polysilsesquioxane calcined product in Comparative Example 2 had an excessively large amount of the Si—H bond, and therefore the battery properties using the negative electrodes produced from the above calcined products were poor in practical use, because while the cycle properties were favorable, the initial discharge capacity was significantly low.

In Comparative Example 3, because the silicate oxide having no hydrogen was used, the battery properties of the battery in which the negative electrode with the negative electrode active material produced from the one covered with the titanium oxide could not provide the same level of the conventional battery, for example, although the initial discharge capacity showed a certain level of value, the capacity decreased rapidly, and further, the capacity was lower than that using a carbon-based negative electrode active material, when compared with the battery properties which produced under the same conditions with the negative electrode using the negative electrode active material in the present invention.

INDUSTRIAL APPLICABILITY

The lithium ion secondary battery having excellent capacity, excellent charge-discharge properties and cycle performance can be obtained by using the negative electrode by using the negative electrode active material for the lithium secondary ion battery obtained the present invention. For example, the present invention is useful technique for a field of batteries, in particular, for the field of secondary batteries.

The invention claimed is:

1. A silicon nanoparticle-containing hydrogen polysilsesquioxane calcined product-metal oxide complex comprising a silicon nanoparticle-containing hydrogen polysilsesquioxane calcined product and a metal oxide,
wherein the silicon nanoparticle-containing hydrogen polysilsesquioxane calcined product comprises 5 to 95% by weight of silicon nanoparticles having a volume-basis mean particle size of more than 10 nm and less than 500 nm and a silicon oxide structure derived from a hydrogen polysilsesquioxane being chemically bonded to a surface of each of the silicon nanoparticles and covering the silicon nanoparticles,
wherein the silicon nanoparticle-containing hydrogen polysilsesquioxane calcined product is represented by a general formula $SiO_xH_y$ ($0.01<x<1.35$, $0<y<0.35$),
wherein the silicon nanoparticle-containing hydrogen polysilsesquioxane calcined product has a Si—H bond, and
wherein the metal oxide comprises at least one of metals selected from the group consisting of titanium, zinc, zirconium, aluminum and iron.

2. The silicon nanoparticle-containing hydrogen polysilsesquioxane calcined product-metal oxide complex according to claim 1, wherein when an intensity of a maximum absorption peak within an absorption band of 820 to 920 $cm^{-1}$ derived from a Si—H bond is $I_1$ and an intensity of a maximum absorption peak within an absorption band in 1000 to 1250 $cm^{-1}$ derived from a Si—O—Si bond is $I_2$ in an spectrum obtained by measuring the silicon nanoparticle-containing hydrogen polysilsesquioxane calcined product by the infrared spectroscopy, an intensity ratio ($I_1/I_2$) is in a range of from 0.01 to 0.35.

3. The silicon nanoparticle-containing hydrogen polysilsesquioxane calcined product-metal oxide complex according to claim 1, wherein within an absorption band in 1000 to 1250 $cm^{-1}$ derived from the Si—O—Si bond, when an intensity of a maximum absorption peak in a wavelength of 1100 $cm^{-1}$ or higher is $I_{2-1}$ and an intensity of a maximum absorption peak in a wavelength of 1100 $cm^{-1}$ or lower is $I_{2-2}$ in the spectrum obtained by measuring the silicon nanoparticle-containing hydrogen polysilsesquioxane calcined product by the infrared spectroscopy, an intensity ratio ($I_{2-1}/I_{2-2}$) is greater than 1.

4. The silicon nanoparticle-containing hydrogen polysilsesquioxane calcined product-metal oxide complex according to claim 1, wherein at least one part of the surface of the silicon nanoparticle-containing hydrogen polysilsesquioxane calcined product is covered with the metal oxide.

5. The silicon nanoparticle-containing hydrogen polysilsesquioxane calcined product-metal oxide complex according to claim 1, comprising more than 0% by weight and 10% by weight or less of the metal oxide.

6. The silicon nanoparticle-containing hydrogen polysilsesquioxane calcined product-metal oxide complex according to claim 1, wherein the metal oxide is titanium oxide.

7. A negative electrode active material for a lithium ion battery comprising the silicon nanoparticle-containing hydrogen polysilsesquioxane calcined product-metal oxide complex according to claim 1.

8. A negative electrode for a lithium ion battery comprising the negative electrode active material for a lithium ion battery according to claim 7.

9. A lithium ion battery comprising the negative electrode for a lithium ion battery according to claim 8.

10. A method for producing a silicon nanoparticle-containing hydrogen polysilsesquioxane calcined product-metal oxide complex comprising a silicon nanoparticle-containing hydrogen polysilsesquioxane calcined product and a metal oxide,
wherein the silicon nanoparticle-containing hydrogen polysilsesquioxane calcined product comprises 5 to 95% by weight of silicon nanoparticles having a volume-basis mean particle size of more than 10 nm and less than 500 nm and a silicon oxide structure derived from a hydrogen polysilsesquioxane being chemically bonded to a surface of each of the silicon nanoparticles and covering the silicon nanoparticles,
wherein the silicon nanoparticle-containing hydrogen polysilsesquioxane calcined product is represented by a general formula $SiO_xH_y$ ($0.01<x<1.35$, $0<y<0.35$),
wherein the silicon nanoparticle-containing hydrogen polysilsesquioxane calcined product has a Si—H bond, and
wherein the metal oxide comprises at least one of metals selected from the group consisting of titanium, zinc, zirconium, aluminum and iron;
wherein the method comprising:

covering at least one part of a surface of the silicon nanoparticle-containing hydrogen polysilsesquioxane calcined product with the metal oxide by hydrolyzing a metal alkoxide in the presence of the silicon nanoparticle-containing hydrogen polysilsesquioxane calcined product and, heating the silicon nanoparticle-containing hydrogen polysilsesquioxane calcined product covered with the metal oxide within a temperature range of 200 to 900° C. under the inert gas atmosphere.

11. A method according to claim 10 wherein the metal alkoxide is a titanium tetra-alkoxide.

* * * * *